(12) United States Patent
Butcher et al.

(10) Patent No.: US 7,755,720 B2
(45) Date of Patent: Jul. 13, 2010

(54) ELECTRO-OPTICAL FILTER

(75) Inventors: Roland Butcher, Mt. Lawley (AU); Dmitri Yu Stephanov, Croydon Park (AU)

(73) Assignee: Live Technologies, Ltd, Mt. Lawley, WA (AU)

( * ) Notice: Subject to any disclaimer, the term of this patent is extended or adjusted under 35 U.S.C. 154(b) by 108 days.

(21) Appl. No.: 11/913,770

(22) PCT Filed: May 2, 2006

(86) PCT No.: PCT/AU2006/000578

§ 371 (c)(1),
(2), (4) Date: Jan. 22, 2008

(87) PCT Pub. No.: WO2006/119541

PCT Pub. Date: Nov. 16, 2006

(65) Prior Publication Data

US 2008/0198279 A1    Aug. 21, 2008

(30) Foreign Application Priority Data

May 10, 2005   (AU) ............................... 2005902324
Feb. 28, 2006   (AU) ............................... 2006900993

(51) Int. Cl.
  *G02F 1/1335*   (2006.01)
  *G02F 1/135*    (2006.01)
  *G02F 1/13*     (2006.01)

(52) U.S. Cl. ..................... 349/113; 349/25; 349/195

(58) Field of Classification Search ................. None
  See application file for complete search history.

(56) References Cited

U.S. PATENT DOCUMENTS

| 4,343,535 | A |   | 8/1982 | Bleha, Jr. |
| 5,168,378 | A | * | 12/1992 | Black et al. ................. 349/195 |
| 5,621,486 | A |   | 4/1997 | Doany et al. |
| 5,729,010 | A | * | 3/1998 | Pinkus et al. ......... 250/214 VT |
| 5,797,050 | A | * | 8/1998 | Smith ......................... 396/241 |
| 5,953,082 | A | * | 9/1999 | Butcher ....................... 349/13 |
| 6,636,278 | B1 | * | 10/2003 | Dultz et al. .................. 349/25 |

FOREIGN PATENT DOCUMENTS

| JP | 02001832 | 1/1990 |
| JP | 08-205024 | 8/1996 |

OTHER PUBLICATIONS

PCT International Search Report for International Application No. PCT/AU2006/000578 dated Jun. 2, 2006, 3 pages.

\* cited by examiner

*Primary Examiner*—Omar Rojas
(74) *Attorney, Agent, or Firm*—Ganz Law, P.C.

(57) ABSTRACT

The present invention provides an electro-optical filter for filtering light from an object. The filter is arranged for receiving the light via a first imaging element and comprises a plurality of reflective elements for receiving and reflecting the light. Each reflective element has an optical property that is dependent on an intensity of the light at or near the reflective element. The optical property controls local filtering of the light intensity in a manner such that, above a predetermined intensity threshold, the filter reduces intensity differences of light originating from bright and dark regions of the object.

20 Claims, 6 Drawing Sheets

ELECTRO-OPTICAL FILTER

FIELD OF THE INVENTION

The present invention broadly relates to an electro-optical filter.

BACKGROUND OF THE INVENTION

Imaging of objects which have a large dynamic brightness range is a challenge. For example, a camera may be adjusted for recording a bright image area within the camera's field of view, in which case a dark image area within the camera's field of view typically is underexposed on a recording medium. Alternatively, the camera may be adjusted for recording the dark image area in which case the bright image area is overexposed. In neither case is it possible to record all details at the bright and dark areas simultaneously.

U.S. Pat. No. 5,953,082 describes a transmission filter that reduces intensity differences of light originating from bright and dark regions of the object and the present invention provides an alternative filter which has additional advantages.

SUMMARY OF THE INVENTION

The present invention provides in a first aspect an electro-optical filter for filtering light from an object, the filter being arranged for receiving the light via a first imaging element and comprising:

a plurality of reflective elements for receiving and reflecting the light, each reflective element having an optical property that is dependent on an intensity of the light at or near the reflective element, the optical property controlling local filtering of the light intensity in a manner such that, above a predetermined intensity threshold, the filter reduces intensity differences of light originating from bright and dark regions of the object.

The electro-optical filter may be used for, or may be incorporated in, any type of image capturing or viewing instrument including for example a video camera, a still camera and a viewing instrument such as binoculars. As the filter reduces light intensity differences, objects having a large dynamic brightness can typically be imaged without loss of detail which is of significant practical advantage. Further, as the filter is a reflective device, control electronic and support material may be positioned behind a reflective surface of the filter and therefore do not impact on the light throughput in the same manner as in a transmissive device.

The filter may comprise a matrix of the reflective elements and typically comprises two matrices of the reflective elements. Each matrix may comprise a large number of the reflective elements, such as 2-10 million. Each reflective element may have a size of 5-20 μm×5-20 μm, typically 9 μm×9 μm.

Each reflective element typically is arranged so that a polarisation of the light is rotated as a function of light detected at or near the reflective element. Each reflective element typically comprises an optical element, such as a photo-diode, that in use detects the local light intensity by exhibiting a respective electrical conductivity. Each reflective element typically also comprises a reflective surface, such as a metallic surface.

In one specific embodiment of the present invention, each reflective element comprises a liquid crystal material. The liquid crystal material typically is positioned between the metallic surface and a transparent conductive coating so that the metallic surface and the transparent conductive coatings can be used to apply an electric field across the liquid crystal material. Each matrix of reflective elements may comprise a silicon substrate and may be a Liquid Crystal on Silicon (LCoS) device which typically also comprises further electronic components. Such a device may be manufactured using complementary metal oxide semiconductor (CMOS) processes.

The filter typically comprises a birefringent beam splitter which is arranged for receiving light from the first imaging element and splitting the received light into light having two orthogonal polarisation states. The filter may, for example, be arranged so that light having a first polarisation state is directed to a first matrix of reflective elements and light having a second polarisation state is directed to a second matrix of reflective elements.

Each reflective element typically is arranged so that the light intensity detected by each photo-diode controls a voltage and the voltage controls the optical activity of each liquid crystal. For example, each liquid crystal may be arranged so that, above or below a threshold voltage applied to the liquid crystal, the liquid crystal effects a rotation of the polarisation of the reflected by an angle between 0° and 90°. The birefringent beam splitter may then be arranged to direct substantially all reflected light having a polarisation rotated by 90° so that it can be used for forming the image. Some or all of the light having a polarisation rotated by an angle smaller than 90° may be returned or otherwise diverted so that it is not used for forming image.

Each reflecting element may comprise electronic components that are embedded in a region underneath the reflective surface. Each reflective element, and typically the entire matrix of reflective elements, may be an integrated device formed on a silicon substrate.

The device typically comprises the first imaging element, such as a lens, which typically is arranged so that a focal plane of the first imaging plane is at or near a plane defined by the reflective surfaces of the reflective elements. Further, the device may comprise a second imaging element for forming a filtered image in an image plane.

The present invention provides in a second aspect a viewing or image capturing device comprising the filter according to the first aspect of the present invention.

The present invention provides in a third aspect a method of filtering light from an object, the method comprising:

receiving the light via a first imaging element by a plurality of reflective elements, each reflective element having a optical property that is dependent on an intensity of the light at or near the reflective element, detecting the light intensity at or near each reflective element, controlling the optical property of each reflective element in a manner such that, above a predetermined intensity threshold, the filter reduces intensity differences of light originating from bright and dark regions of the object.

The invention will be more fully understood from the following description of specific embodiments of the invention. The description is provided with reference to the accompanying drawings.

DETAILED DESCRIPTION OF SPECIFIC EMBODIMENTS

Figure 1:
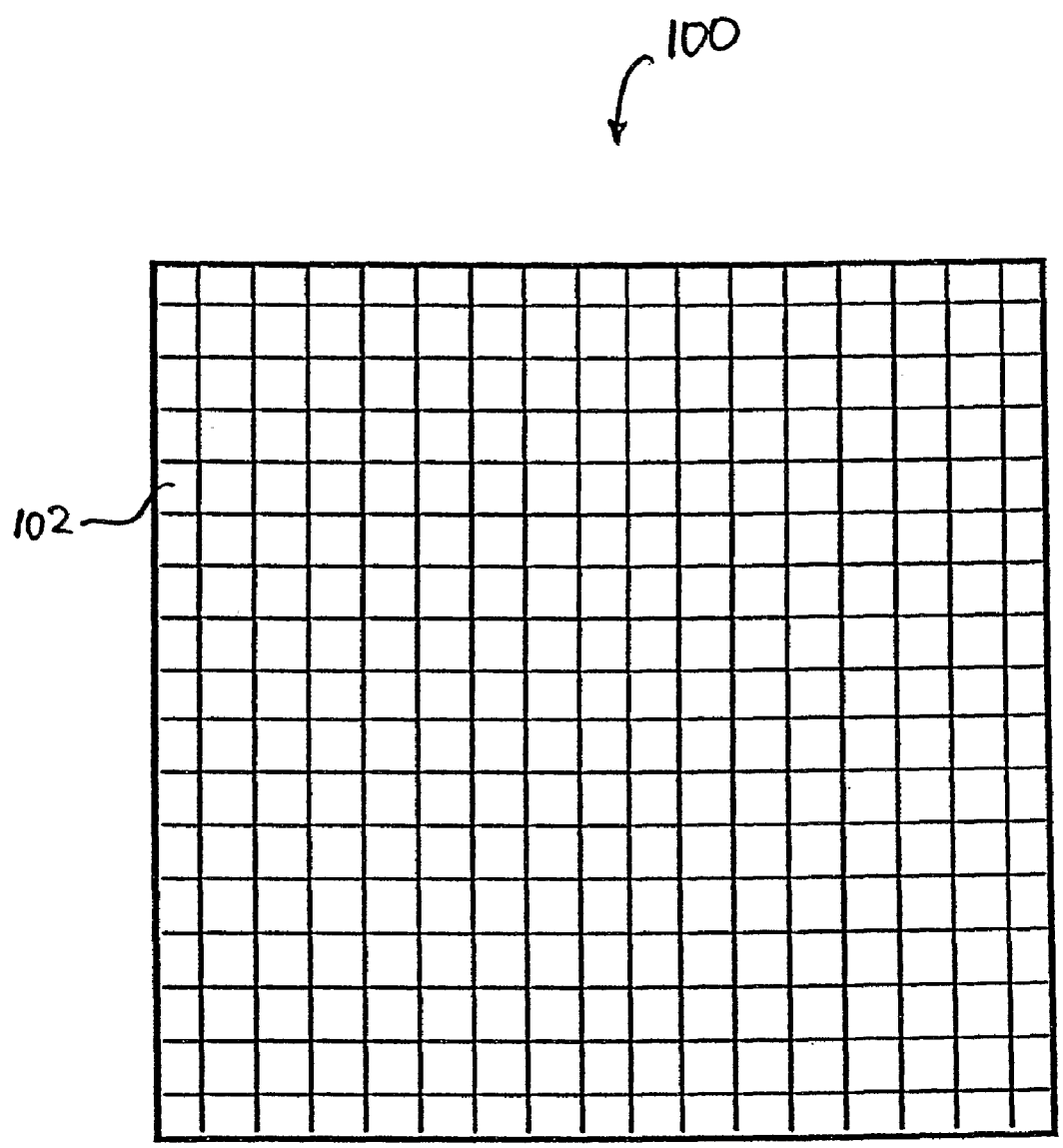
FIG. 1 shows a top view of a matrix of reflective elements according to an embodiment of the present invention.
Figure 2:
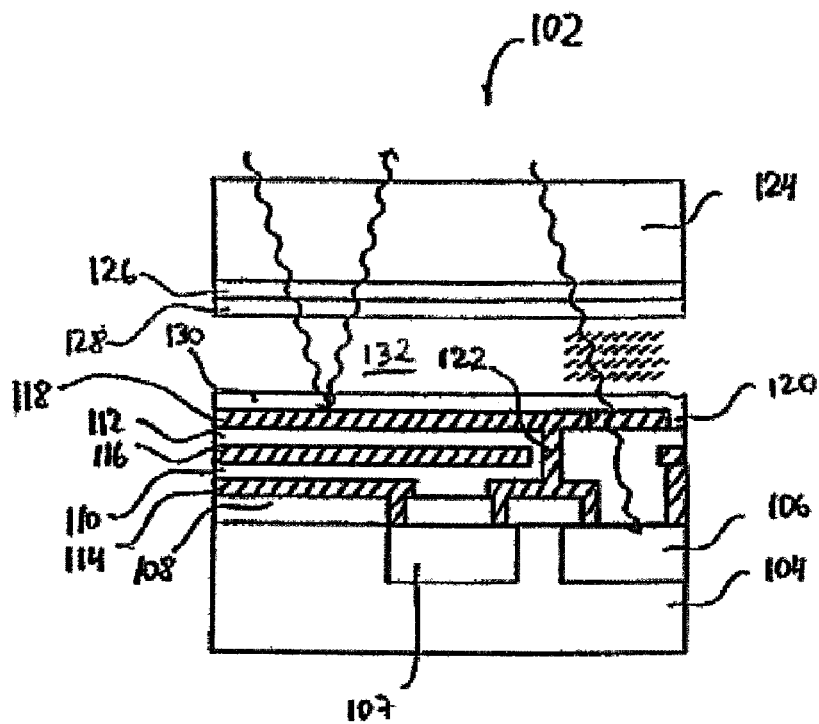
FIG. 2 shows a cross-sectional view of a reflective element according to an embodiment of the present invention.
Figure 3:
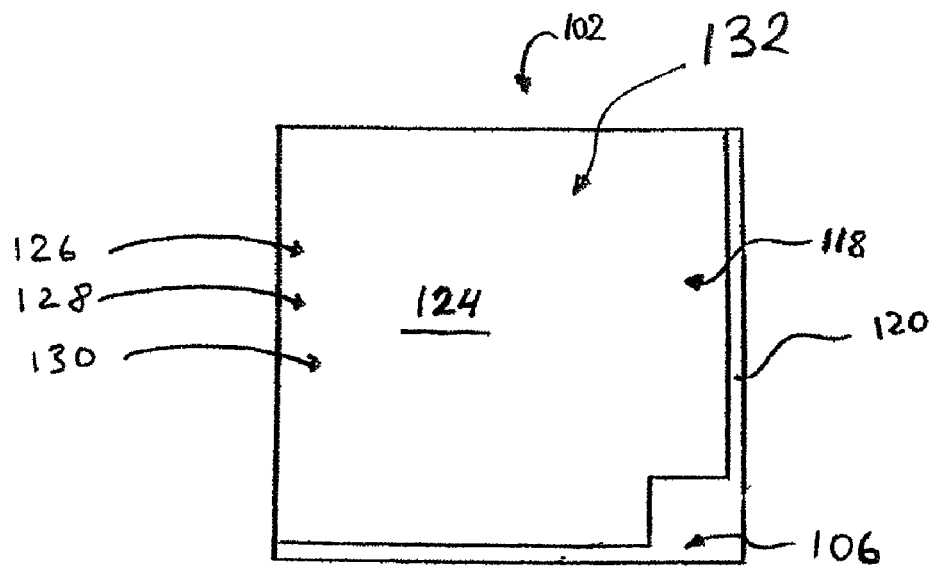
FIG. 3 shows a top view of a reflective element according to an embodiment of the present invention.

Referring initially to FIGS. 1 to 3, an electro-optical filter according to an embodiment of the present invention is now described. The electro-optical filter 100 comprises a matrix of reflective elements 102. In this embodiment the electro-optical filter 100 is fabricated using Liquid Crystal on Silicon (LCoS) technology which is often used for fabricating displays for projection devices and rear projection televisions.

Each reflective element 102 is in this embodiment formed on a silicon substrate 104 on which photodiode structures 106, 107 and transparent insulating layers 108, 110 and 112 are positioned. Further, the reflective element 102 comprises a plurality of metallic layers, such as layer 114 for drive circuitry wiring, layer 116 for drive circuitry wiring and voltage field shielding, and layer 118 which forms a reflective mirror-type electrode. Layer portion 120 defines a gap between adjacent reflective elements 102 in the matrix and a via 122 electrically connects the reflective layer 118 with underlying circuitry. The reflective element 102 also comprises a glass substrate 124 with a monolithic layer forming a transparent conductive electrode 126, and liquid crystal alignment layers 128 and 130. A liquid crystal material 132 is sandwiched between the layers 128 and 130.

Each reflective element 102 comprises a window in the reflective mirror-type electrode 118 which enables light from the subject image to reach the photo-diode structure 106. The photo-diode structure 107 is overlapped by metallic layers and does not receive light.

The liquid crystal material 132 may for example comprise TN, STN, or a polymeric material. However, a person skilled in the art will appreciate that the liquid crystal material 132 may alternatively comprise other materials or may be of another type. The arrangement of (a) liquid crystal cell(s) with a polarising beam splitter may be referred to as a "normally white" arrangement to indicate that light is allowed to pass through the arrangement if no voltage is applied to the liquid crystal material. A variation of such an arrangement is, for example, described in "Design and fabrication of reflective nematic displays with only one polarizer"; Kwok, Hoi-Sing; Yu, F. H.; Tang, S. T; Chen, J in: Liquid crystals, Proceedings of SPIE, Vol. 3143, San Diego, Calif., USA, 28-29 Jul., 1997, SPIE, Bellingham, Wash., USA, 1997, p. 39-50. The reference to this prior art document does not constitute an admission that the prior art document is a part of the common general knowledge in Australia or in any other country.

Figure 4:
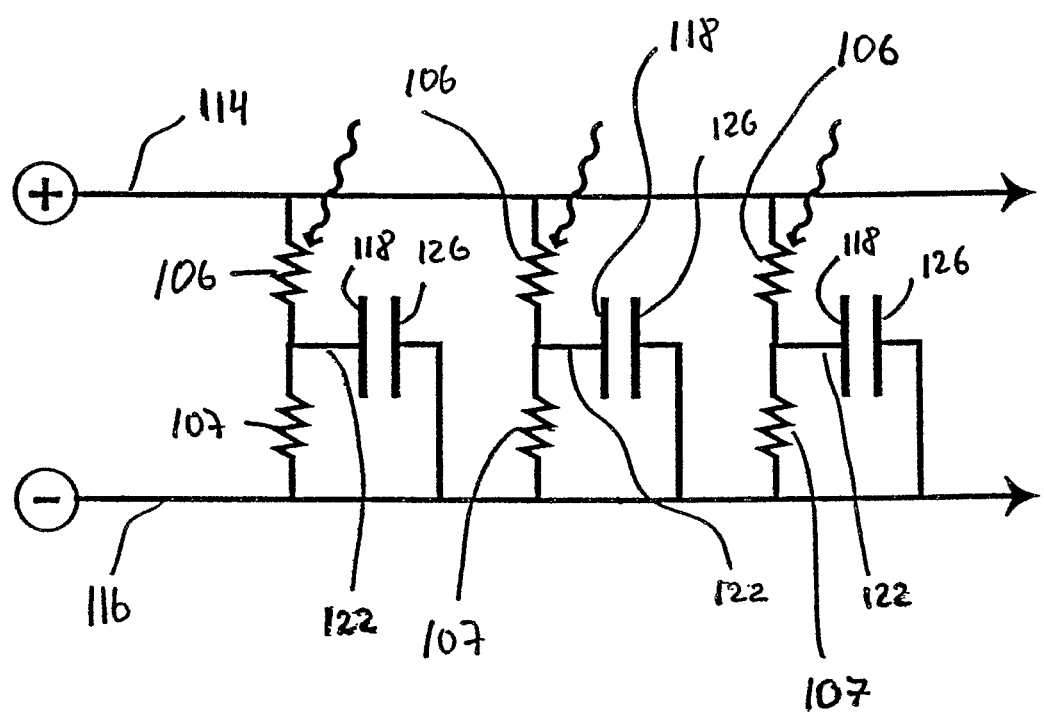
FIG. 4 shows a circuit diagram of a reflective element according to an embodiment of the present invention.

FIG. 4 shows a circuit diagram for three of the reflective elements 102. Components of the circuit diagram are identified using the same reference numerals as the corresponding components shown in FIG. 1 to 3. The layers 114 and 116 are connected to a supply voltage and the photodiode structures 106 and 107 are series connected. The reflective electrode 118 is electrically connected by the via 122 to a node between the photodiode structures 106 and 107. The photodiode structures 106 and 107 have identical electrical properties and when light from an object (not shown) is sufficiently low, the resistance of the photo diode structures 106 and 107 are balanced. The electrical conductivity of the photodiode structure 106 increases as a function of received light in relation to shielded photodiode structure 107. This results in an increase of the voltage applied between the reflective layer 118 and the layer 126, and therefore across the liquid crystal, which changes the optical activity of the liquid crystal.

It is to be appreciated that the above-described drive circuitry is only one example and many other forms are possible. For example, the drive circuit of each reflective element 102 may include another form of voltage divider or may comprise a transistorised amplifier. U.S. Pat. No. 5,953,082 discloses alternative drive circuitries and a person skilled in the art will appreciate that variations of the drive circuitry disclosed in U.S. Pat. No. 5,953,082 may also be used in alternative embodiments of the present invention.

Figure 5:
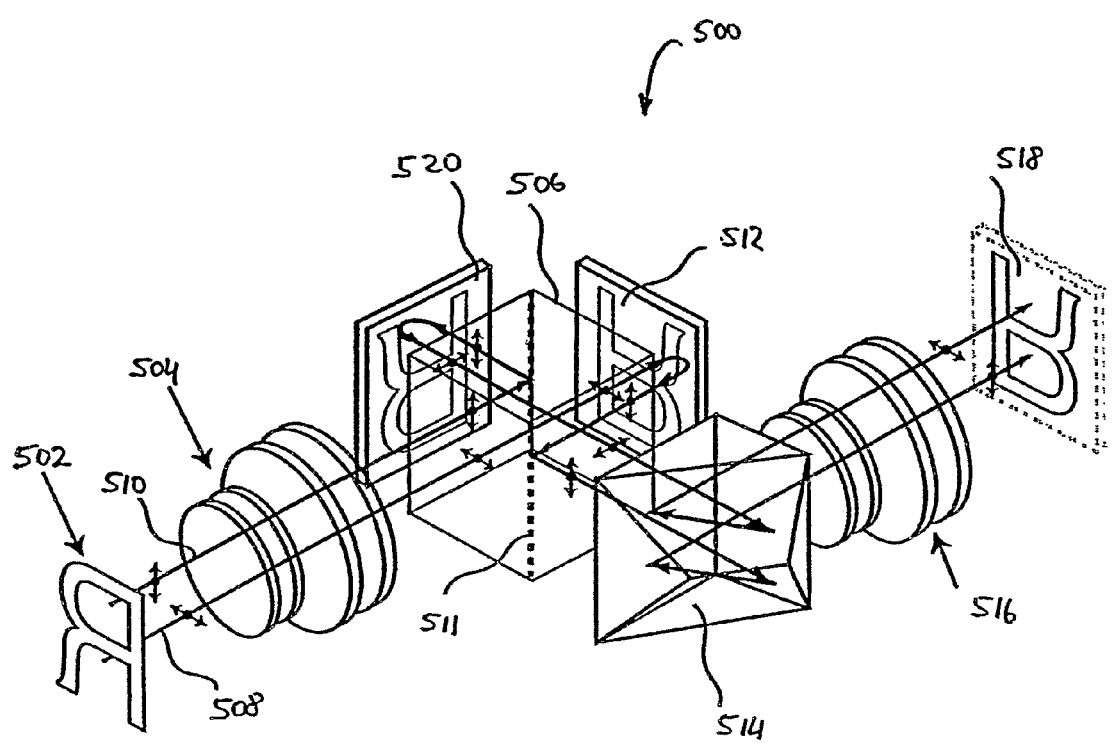
FIG. 5 shows an electro-optical filter according to an embodiment of the present invention.

Referring now to FIG. 5, the function of an electro-optical filter 500 according to an embodiment of the present invention is now described. Light from object 502 is transmitted via an optical element, in this embodiment lens system 504. A polarising beam splitter prism 506 divides the light from the object 502 into horizontally polarised light 508 and vertically polarised light 510 at birefringent layer 511. The horizontally polarised light 508 passes through the birefringent layer 511 and reaches matrix 512 which comprises a plurality of the above-described reflective elements 102. The reflective elements 102 of the matrix 512 reflect light with a 90 degree rotation of polarisation when in an 'off' state and reflect light with a smaller rotation when sufficient light is received by a the photodiodes 106 and the reflective elements 102 are in an "on" state. Above a predetermined threshold intensity of light received by the photodiodes 106, the light is reflected without rotation of polarisation.

The polarisation of light reflected from a reflective element in an "off" state is rotated from horizontal to vertical polarity and thus is reflected by birefringent layer 511 to a prism 514 and to a second lens system 516, which is in this embodiment a relay lens system, where it is used to form image 518. The light reflected at reflective elements 102 which are in an "on" state has at least a horizontal polarisation component (or is entirely horizontally polarised) and the light associated with the horizontal polarisation passes through the birefringent layer 511 to be returned back up the optical path and thus is not used for forming the image 518.

The vertically polarised beam 508 is reflected by birefringent layer the 511 towards the matrix 520 of the reflective elements 102. The polarisation of light reflected from a reflective element in an "off" state is rotated from vertical to horizontal polarity and thus is transmitted by the birefringent layer 511 to a prism 514 and to the second lens system 516 where it is used to form the image 518. The light reflected at reflective elements 102 which are in an "on" state has at least a vertical polarisation component (or is entirely vertically polarised) and the light associated with the vertical polarisation is reflected by the birefringent layer 511 to be returned back up the optical path and thus is not used to form the image 518.

In this embodiment, the focal plane of lens system 504 is at or near the reflective surfaces of the reflective elements 102 in the matrices 512 and 520. Thus a focused or largely focused image of the object 502 is filtered. In this embodiment, the prism 514 is used to produce an image having corrected horizontal and vertical orientation at a recording or viewing plane of an image capturing or viewing device. In this example an "amici" prism is used, but a person skilled in the art will appreciate that various alternative types of prisms or mirror can be used to orientate the image 518. Further, in other variation of the described embodiment the filter may not comprise a prism or any other means to orientate the image.

Figure 6:
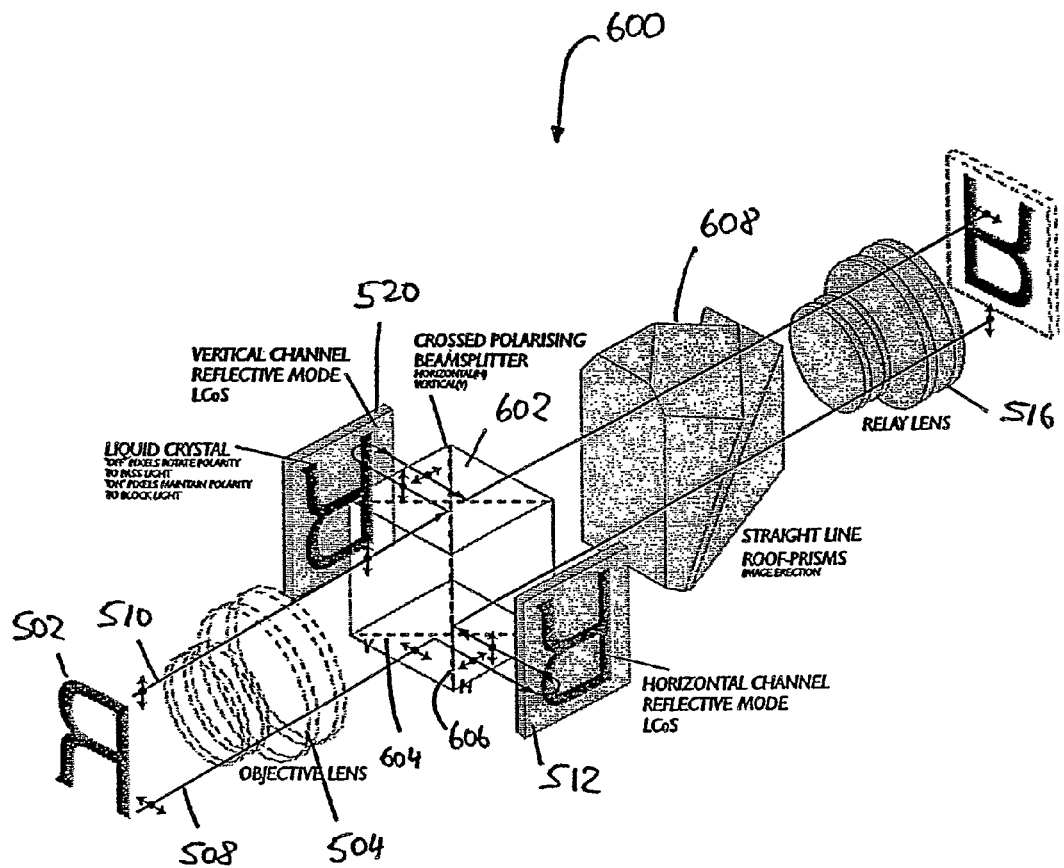
FIG. 6 shows an electro-optical filter according to another embodiment of the present invention.
Figure 7:
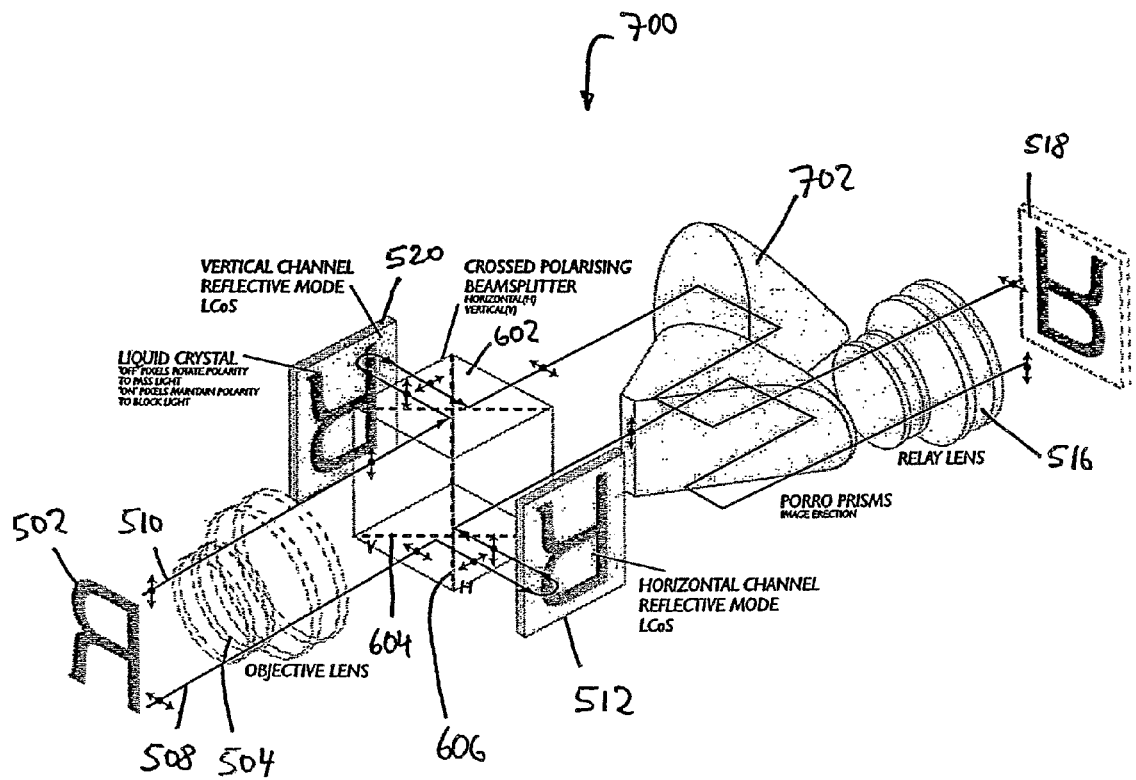
FIG. 7 shows an electro-optical filter according to a further embodiment of the present invention.

FIGS. 6 and 7 show further embodiments of electro-optical active filters 600 and 700 according to embodiments of the present invention. The filters 600 and 700 comprise crossed polarising beam-splitters 602 having crossed birefringent layers 604 and 606. The filters 600 and 700 function as follows. Vertically polarised light 510 is reflected by birefringent layer 606 towards matrix 520 of reflective elements 102. The polarisation of light reflected from a reflective element 102 in an "off" state is rotated from vertical to horizontal polarity and thus is transmitted by birefringent layer 606 and reflected by layer 604 to a prism 608 or 702 and to the second lens system 516 where it is used for forming the image 518. The light reflected at reflective elements 102 which are in an "on" state is at least partially or largely vertically polarised (or is entirely vertically polarised) and the light associated with the vertical polarisation is reflected by the birefringent layer 606 to be returned back up the optical path and thus is not used to form the image 518.

Horizontally polarised light 508 is reflected by birefringent layer 604 towards matrix 512 of reflective elements 102. The polarisation of light reflected from a reflective element in an "off" state is rotated from horizontal to vertical polarity and thus is transmitted by birefringent layer 604 and reflected by layer 606 to the prism 608 or 702 and to the second lens system 516 where it is used for forming the image 518. The light reflected at reflective elements 102 which are in an "on" state is at least is at least partially or largely horizontally polarised (or is entirely horizontally polarised) and the light associated with the horizontal polarisation is reflected by the birefringent layer 604 to be returned back up the optical path and thus is not used for forming the image 518.

The embodiments illustrated in FIGS. 6 and 7 differ in the prisms 608 and 702. Prism 608 is a straight line roof prism and prism 702 is a "proro" prism.

The electro-optical filter may be used for, may be incorporated in or retrofitted to, a wide range of devices including for example binoculars, telescopes, still cameras, video cameras, photocopiers, microscopes and night vision devices. For example, the filter may be positioned between a camera lens and a recording medium of the camera.

The reference that is being made to U.S. Pat. No. 5,953,082 does not constitute an admission that U.S. Pat. No. 5,953,082 is part of the common general knowledge in Australia or in any other country.

Although the invention has been described with reference to particular examples, it will be appreciated by those skilled in the art that the invention may be embodied in many other forms. For example, the filter may not comprise a liquid crystal material and a birefringent beam-splitter, but may alternatively comprise another type of reflective elements that have a reflectivity, which depends on an intensity of received light.

The invention claimed is:

1. An electro-optical filter for filtering light from an object, the filter being arranged for receiving the light via a first imaging element and comprising:
    a plurality of reflective elements for receiving and reflecting the light, each reflective element having an optical property;
    control electronics comprising a plurality of optical elements and being positioned partially behind reflective surfaces of the reflective elements, each optical element being positioned at or near a respective reflective element for receiving the light form the same incident light pathway as the respective reflective element, each optical element being arranged to control the optical property of the respective reflective element as a function of an intensity of the received light; and
    a beam splitter which is arranged for receiving light from the first imaging element and splitting the received light into light having two orthogonal polarisation states;
    wherein the optical property controls local filtering of the light intensity in a manner such that, above a predetermined intensity threshold, the filter reduces intensity differences of light originating from bright and dark regions of the object.

2. The electro-optical filter as claimed in claim 1 wherein each reflective element is arranged so that a polarisation of the light is rotated as a function of light detected by the respective optical element.

3. The electro-optical filter as claimed in claim 1 comprising at least one matrix of the reflective elements.

4. The electro-optical filter as claimed in claim 1 comprising two matrices of the reflective elements.

5. The electro-optical filter as claimed in claim 1 wherein the optical elements are arranged to detect the local light intensity by exhibiting a respective electrical conductivity.

6. The electro-optical filter as claimed in claim 5 wherein each optical element is a photo-diode.

7. The electro-optical filter as claimed in claim 1 wherein each reflective element comprises a liquid crystal material.

8. The electro-optical filter as claimed in claim 7 wherein the liquid crystal material is positioned between a metallic reflective surface and a transparent conductive coating so that the metallic surface and the metallic coatings can be used to apply an electric field across the liquid crystal material.

9. The electro-optical filter as claimed in claim 3 wherein the or each matrix of reflective elements comprises a silicon substrate.

10. The electro-optical filter as claimed in claim 9 wherein the or each matrix of reflective elements is Liquid Crystal on Silicon (LCoS) device.

11. The electro-optical filter as claimed in claim 1, wherein the beam splitter comprises a birefringement beam splitter.

12. The electro-optical filter as claimed in claim 10 wherein each reflective element is arranged so that the light intensity detected by each photo-diode controls a voltage and the voltage controls the optical activity of a respective liquid crystal.

13. The electro-optical filter as claimed in claim 12 wherein each liquid crystal is arranged so that, above or below a threshold voltage applied to the liquid crystal, the liquid crystal effects a rotation of the polarisation of the reflected light by an angle between 0° and 90°.

14. The electro-optical filter as claimed claim 13 comprising a birefringent beam splitter and being arranged to direct substantially all reflected light having a polarisation rotated by 90° so that it can be used for forming the image and for directing at least some of the light having a polarisation rotated by an angle smaller than 90° so that it is not used for forming image.

15. The electro-optical filter as claimed in claim 1 wherein each reflecting element comprises electronic components that are embedded in a region underneath the reflective surface.

16. The electro-optical filter as claimed in claim 1 comprising at least one matrix of the reflecting elements and wherein the or each matrix of the reflective elements is an integrated device formed on a silicon substrate.

17. A viewing or image capturing device comprising:
    an electro-optical filter for filtering light from an object, wherein the filter is arranged for receiving the light via a first imaging element, wherein the filter comprises (i) a plurality of reflective elements for receiving and reflecting the light, each reflective element having an optical property, wherein the optical property controls local filtering of the light intensity in a manner such that, above a predetermined intensity threshold, the filter reduces intensity differences of light originating from bright and dark regions of the object;

(ii) control electronics comprising a plurality of optical elements and being positioned partially behind reflective surfaces of the reflective elements, each optical element being positioned at or near a respective reflective element for receiving the light form the same incident light pathway as the respective reflective element, each optical element being arranged to control the optical property of the respective reflective element as a function of an intensity of the received light; and (iii) a beam splitter which is arranged for receiving light from the first imaging element and splitting the received light into light having two orthogonal polarisation states; and a lens system configured to form an image from light having one of the Polarisation states.

18. A method of filtering light from an object, the method comprising:

receiving the light via a first imaging element by a plurality of reflective elements, each reflective element having a optical property that is dependent on an intensity of the light at or near the reflective element;

splitting the received light into light having two orthogonal polarisation states;

detecting the light intensity at or near each reflective element, the light being received for detection from the same direction as the light that is received by the reflective elements; and controlling the optical property of each reflective element using control electronics positioned partially behind reflective surfaces of the reflective elements in a manner such that, above a predetermined light intensity threshold, the filter reduces intensity differences of light originating from bright and dark regions of the object.

19. An electro-optical filter for filtering light from an object, the filter being arranged for receiving the light via a first imaging element and comprising:

a plurality of reflective elements for receiving and reflecting the light, each reflective element having an optical property;

a plurality of optical elements, each optical element being positioned at or near a respective reflective element for receiving the light form the same incident light pathway as the respective reflective element, each optical element being arranged to control the optical property of the respective reflective element as a function of an intensity of the received light;

a birefringent beam splitter which is arranged for receiving light from the first imaging element and splitting the received light into light having two orthogonal polarisation states; and wherein the optical property controls local filtering of the light intensity in a manner such that, above a predetermined intensity threshold, the filter reduces intensity differences of light originating from bright and dark regions of the object.

20. An electro-optical filter for filtering light from an object, the filter being arranged for receiving the light via a first imaging element and comprising:

a plurality of reflective elements for receiving and reflecting the light, each reflective element having an optical property comprising at least one matrix of the reflective elements comprising a silicon substrate wherein the or each matrix of reflective elements is Liquid Crystal on Silicon (LCoS) device, wherein each reflective element is arranged so that the light intensity detected by each photo-diode controls a voltage and the voltage controls the optical activity of a respective liquid crystal, and wherein each liquid crystal is arranged so that, above or below a threshold voltage applied to the liquid crystal, the liquid crystal effects a rotation of the polarisation of the reflected light by an angle between 0° and 90°;

a plurality of optical elements, each optical element being positioned at or near a respective reflective element for receiving the light form the same incident light pathway as the respective reflective element, each optical element being arranged to control the optical property of the respective reflective element as a function of an intensity of the received light;

a birefringent beam splitter and being arranged to direct substantially all reflected light having a polarisation rotated by 90° so that it can be used for forming the image and for directing at least some of the light having a polarisation rotated by an angle smaller than 90° so that it is not used for forming image; and wherein the optical property controls local filtering of the light intensity in a manner such that, above a predetermined intensity threshold, the filter reduces intensity differences of light originating from bright and dark regions of the object.

* * * * *